(12) United States Patent
Lauber et al.

(10) Patent No.: US 8,622,950 B2
(45) Date of Patent: Jan. 7, 2014

(54) ROLLED MAT HEAT EXCHANGER AND METHOD OF MANUFACTURE

(75) Inventors: Kevin Lauber, Minnetonka, MN (US); Robert Olsen, Plymouth, MN (US); Mark Wendler, St. Louis Park, MN (US); Chris Plott, St. Paul, MN (US); Al McLevish, Apple Valley, MN (US)

(73) Assignee: Medtronic, Inc., Minneapolis, MN (US)

( * ) Notice: Subject to any disclaimer, the term of this patent is extended or adjusted under 35 U.S.C. 154(b) by 249 days.

(21) Appl. No.: 13/015,337

(22) Filed: Jan. 27, 2011

(65) Prior Publication Data
US 2011/0270147 A1  Nov. 3, 2011

Related U.S. Application Data

(60) Provisional application No. 61/330,441, filed on May 3, 2010.

(51) Int. Cl.
*A61M 37/00* (2006.01)
*B21D 53/02* (2006.01)

(52) U.S. Cl.
USPC ........................ 604/6.13; 29/890.33

(58) Field of Classification Search
USPC ............... 604/4.01–6.16; 29/890.03
See application file for complete search history.

(56) References Cited

U.S. PATENT DOCUMENTS

| | | | |
|---|---|---|---|
| 3,391,041 A | 7/1968 | Moore | |
| 4,124,069 A | 11/1978 | Becker | |
| 4,203,205 A | 5/1980 | Jouet | |
| 4,357,991 A | 11/1982 | Cameron | |
| 5,044,431 A | 9/1991 | Cameron | |
| 5,143,312 A | 9/1992 | Baurmeister | |
| 5,665,192 A | 9/1997 | Wolki et al. | |
| 5,718,869 A | 2/1998 | Bach et al. | |
| 6,273,355 B1 * | 8/2001 | Van Driel et al. | 242/433.3 |
| 2010/0269342 A1 | 10/2010 | Carpenter et al. | |
| 2010/0272604 A1 | 10/2010 | Carpenter et al. | |
| 2010/0272605 A1 | 10/2010 | Carpenter et al. | |
| 2010/0272607 A1 | 10/2010 | Carpenter et al. | |
| 2010/0274170 A1 * | 10/2010 | Carpenter et al. | 604/6.09 |

FOREIGN PATENT DOCUMENTS

| | | | |
|---|---|---|---|
| WO | 97/25080 A1 | 1/1997 | |
| WO | 97/26029 | 7/1997 | |

OTHER PUBLICATIONS

International Search Report (PCT/US2011/022758) mailed Jun. 1, 2011 (10 pages).

* cited by examiner

*Primary Examiner* — Philip R Wiest (57) ABSTRACT

A method of manufacturing a bundled mat construction for an extracorporeal blood circuit heat exchanger includes attaching a leading edge of a first capillary tube mat segment to a first side of a mandrel. A leading edge of a second capillary tube mat segment is attached to a second side of the mandrel. The first side is diametrically opposite the second side. The mandrel is rolled relative to the mat segments to generate a bundled mat construction. Radial layers of the bundled mat construction are symmetrical relative to a central axis of the mandrel.

14 Claims, 12 Drawing Sheets

ROLLED MAT HEAT EXCHANGER AND METHOD OF MANUFACTURE

CROSS-REFERENCE TO RELATED APPLICATIONS

This application claims priority under 35 U.S.C. §119(e)(1) to U.S. Provisional Patent Application Ser. No. 61/330,441, filed May 3, 2010, entitled "Rolled Mat Heat Exchanger and Method of Manufacture"; and the entire teachings of which are incorporated herein by reference.

BACKGROUND

The present disclosure relates to fluid-to-fluid bundled tube heat exchangers and methods of manufacture. More particularly, the present disclosure relates to bundled capillary tube heat exchangers useful in cardiopulmonary bypass circuits and including a knitted or woven tube mat symmetrically wound about a mandrel, and related methods of manufacture.

Fluid-to-fluid heat exchangers are used in many different industries, and are typically constructed in conjunction with the intended end use. For example, a heat exchanger is an important component of an extracorporeal or cardiopulmonary bypass circuit. As a point of reference, an extracorporeal blood circuit is commonly used during cardiopulmonary bypass (i.e., a heart-lung bypass machine) to withdraw blood from the venous portion of the patient's circulation system and return the blood to the arterial portion. The extracorporeal blood circuit generally includes a venous line, a venous blood reservoir, a blood pump, an oxygenator, a heat exchanger, an arterial line, and blood transporting tubing, ports, and connection pieces interconnecting the components. The oxygenator raises the oxygen content and reduces the carbon dioxide content of the blood arriving from the patient. The heat exchanger regulates a temperature of the extracorporeal blood as desired. For example, the heat exchanger can be located upstream of the oxygenator and operated to cool the blood arriving from the patient prior to oxygenation; alternatively, the heat exchanger can be operated to warm the extracorporeal blood.

Regardless of the direction of heat transfer between the heat exchanger and the patient's blood, extracorporeal blood circuit heat exchangers are generally made of a multiplicity of metal or plastic tubes; a suitable heat transfer fluid, such as water, is pumped the through the tube lumens while the blood flows about the tube exteriors. The heat exchange fluid can be heated or cooled (relative to a temperature of the blood). As blood contacts the tubes, heat transfer occurs between the blood and the heat exchange fluid in an intended direction. Alternatively, blood flow can be through the tube lumens, with the heat exchange fluid flowing about the tube exteriors.

So as to have minimal impact on the circuit's prime volume, the extracorporeal heat exchanger is desirably as small as possible while still providing high heat exchange efficiency. To meet these requirements, extracorporeal heat exchanger tubes are micro-diameter or fiber-like (e.g., outer diameter of 0.05 inches or less), and are oftentimes referred to as capillary tubes. The heat exchange fluid is fluidly isolated from blood of the extracorporeal circuit by a wall thickness of the capillary tubes, keeping the fluids separate but allowing the transfer of heat from one fluid to the other.

A common capillary tube format pre-assembles a large number of the micro-diameter tubes into a mat. The tubes are held together with threads forming the warp of the mat. The tube mat is then wrapped in some fashion to form a capillary tube bundle useful for heat exchanger applications. Typically, the mat is wrapped or rolled around a core or mandrel. As the mat is continuously wound about the mandrel, the mat winds onto itself, resulting in series of radially increasing layers. In light of this well-accepted heat exchanger bundling practice, the capillary tubes of the mat are "biased" so that the tubes are not parallel with a width of the mat. The purpose of the bias angle in the capillary tubes is to prevent the capillaries of subsequent layers from nesting in the gaps between the capillary tubes of an immediately preceding layer as the mat is wound onto itself. The tube angle orientation alternates from layer-to-layer. This arrangement is reflected in FIG. 2C described in greater detail below, and generally entails the tubes of an outer layer and the tubes of an immediately underlying layer being arranged at a crossing angle relative to each other. This crossing angle effect is commonly achieved by forming the bundled construction from a single, pre-made mat having two layers arranged with the alternating tube orientation, or by arranging two separately made mats at opposing tube angles and then wrapping the two mats as a pair.

Conventionally, when using a cylindrical mandrel or core to form the capillary tube bundle, an edge of each of a pair of mat layers with alternating tube orientations are attached to one side of the mandrel and then rolled. While viable, this technique inherently results in an asymmetrical arrangement of the bundled mat (and thus of the mat tubes) relative to an axis of the mandrel. This asymmetry, in turn, may undesirably result in uneven flow distribution through the resultant heat exchanger. Further, because heat exchanger tube mats are commonly provided as dual layer or dual ply structures, an edge of the inner layer is attached to the cylindrical mandrel and then the dual layer mat is wrapped about the mandrel. Not only does this approach create the asymmetrical bundle construction described above, but has the further inherent drawback of the outer layer taking a longer path than the inner layer when wrapping about a curved surface. This inherent constraint limits a curvature of the wrap and thus how small the device can be made. Along these same lines, because the outer layer will take a longer path than the inner layer (when being wrapped about a cylindrical mandrel), if the inner and outer mat layers have the same length when flat, after being wrapped around the mandrel, the outer layer ends much sooner than the inner layer. This undesirable difference accumulates as additional layers are added. Even further, the tension required when rolling the mat is different for the outer layer as compared to the inner layer.

Rolled mat heat exchangers are widely regarded as uniquely providing the small footprint and high heat exchange efficiency requirements of extracorporeal circuits, at an economically viable cost. Any improvements to rolled mat heat exchanger performance and/or techniques for manufacturing a roiled mat heat exchanger will be well-received.

SUMMARY

Some aspects in accordance with principles of the present disclosure relate to a method of manufacturing a bundled mat construction for use in a heat exchanger. First and second capillary tube mat segments are attached to opposing sides of a mandrel. In this regard, the mat segments can be provided as part of a single capillary mat, or can be two separate mats. Regardless, the mandrel is rolled relative to the mat segments to generate a bundled mat construction. By attaching the mat segments at diametrically opposite sides of the mandrel and then rolling the mandrel, methods of the present disclosure beneficially create symmetrical bundled mat constructions. Further, methods of the present disclosure can produce multilayered bundled mat constructions in a simplified, consistent manner. The rolled mat constructions of the present disclosure are highly useful in extracorporeal blood circuit heat exchangers.

DETAILED DESCRIPTION

Figure 1A:
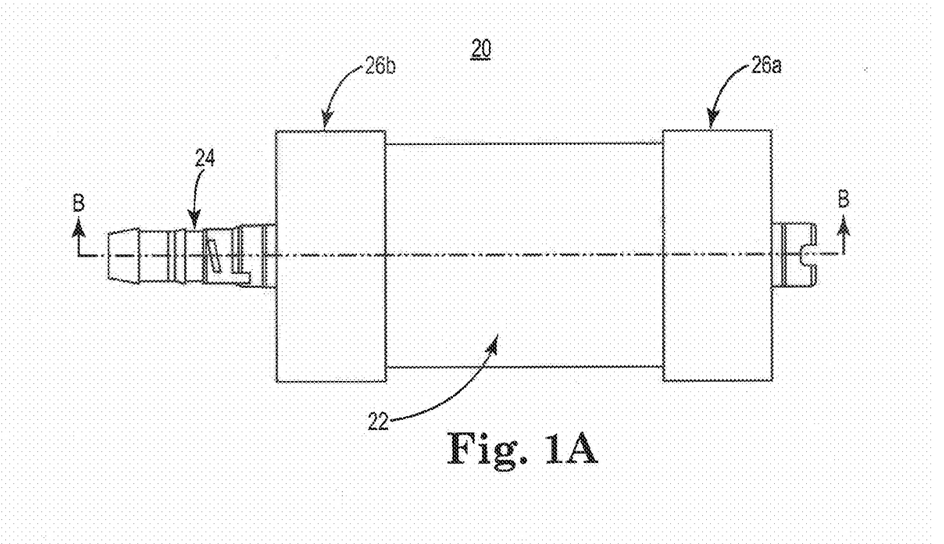
FIG. 1A is a side view of a rolled mat heat exchanger in accordance with principles of the present disclosure.
Figure 1B:
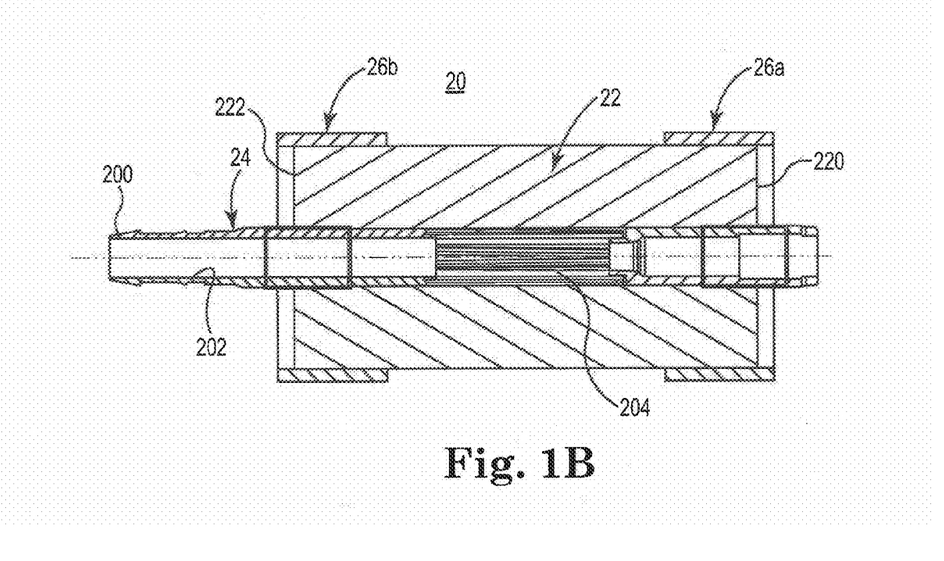
FIG. 1B is a cross-sectional view of the heat exchanger of FIG. 1A.
Figure 1C:
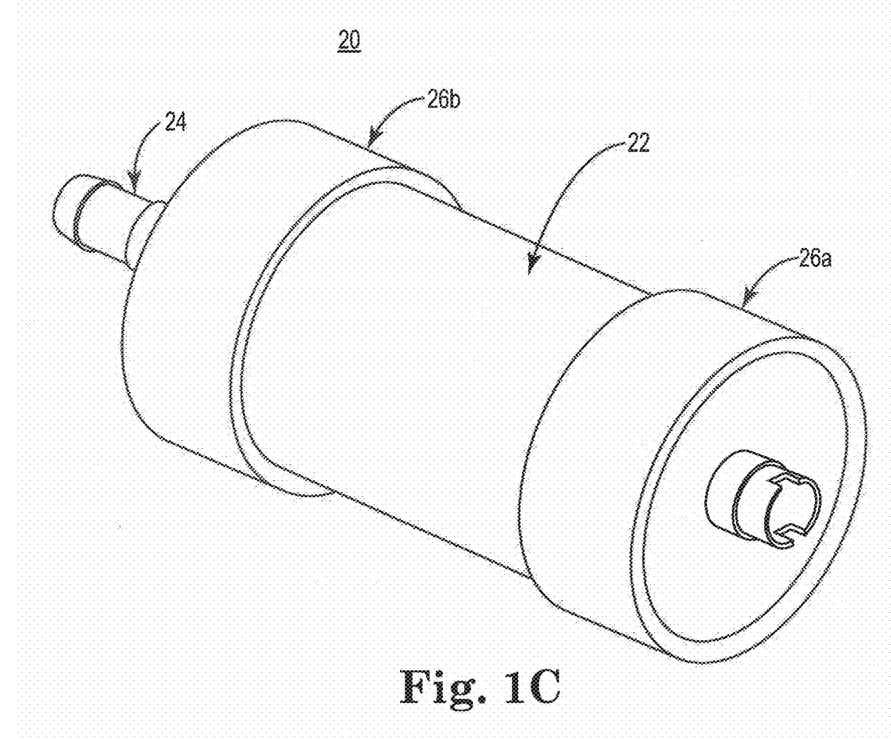
FIG. 1C is a perspective view of the heat exchanger of FIG. 1A.

One embodiment of a rolled mat heat exchanger 20 in accordance with principles of the present disclosure is shown in FIGS. 1A-1C. The heat exchanger 20 includes a bundled mat construction 22 (illustrated schematically) of micro-diameter heat transfer elements (e.g., capillary tubes), a mandrel or core 24 and optional bands 26a, 26b. Details on the various components are provided below. In general terms, however, the bundled mat construction 22 is formed about the mandrel 24 pursuant to the methodologies described below, with the bands 26a, 26b (where provided) serving to secure the bundled mat construction 22 about the mandrel 24. The heat exchanger 20 can be employed in various end-use applications, but has particular usefulness as part of an extracorporeal circuit. In some embodiments, the heat exchanger 20 is connected within the extracorporeal circuit (or other environment requiring transfer of heat between fluids) as a standalone device (e.g., the heat exchanger 20 is part of a heat exchanger apparatus, assembled within a separate housing to establish fluid connections and flow paths for the blood and heat exchange fluid); alternatively, heat exchangers of the present disclosure can be assembled to, or formed as part of, a combination extracorporeal blood circuit apparatus or device, such as a combination oxygenator and heat exchanger apparatus.

Figure 2A:
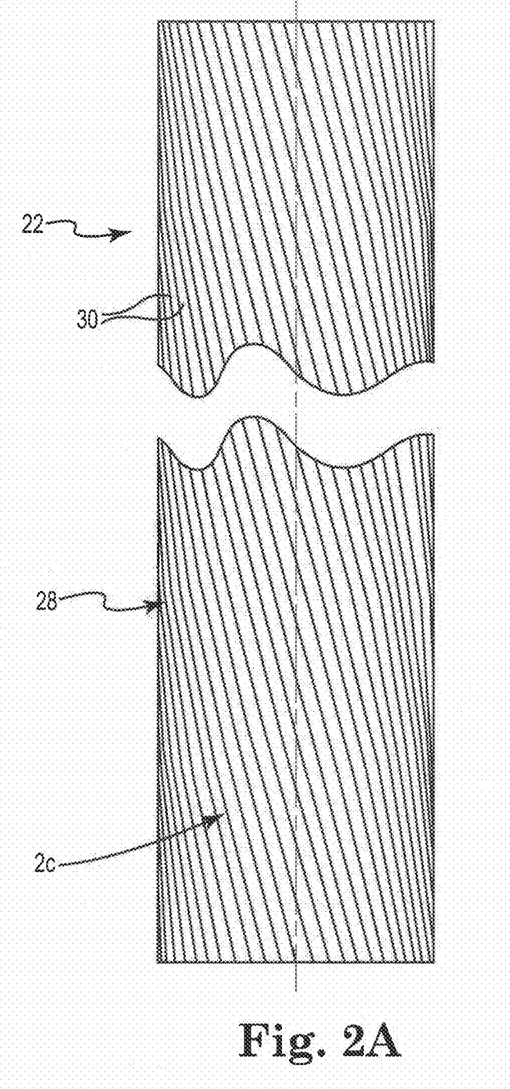
FIG. 2A is a side view of a bundled mat construction component of the heat exchanger of FIG. 1A.
Figure 2B:
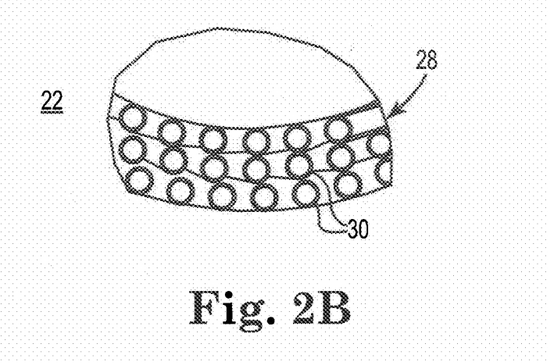
FIG. 2B is a magnified end view of a portion of the bundled mat construction of FIG. 2A.
Figure 2C:
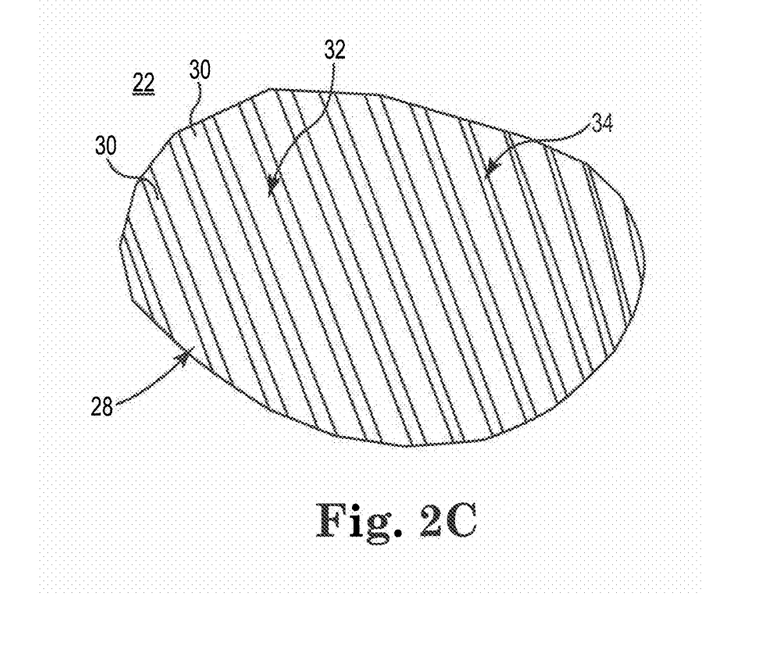
FIG. 2C is a magnified side view of a portion of the bundled mat construction of FIG. 2A and showing a crossing angle effect between alternating tube layers.

The bundled mat construction 22 includes one or more capillary mats 28 (or mat segments) wound or rolled about the mandrel 24 that each consist of a plurality of hollow heat transfer elements in the form of micro-diameter capillary tubes or fibers 30 as shown in FIGS. 2A and 2B. The capillary tubes 30 are formed of a thermally conductive polymer or metal, for example polyethylene terephthalate (PET) or polyurethane. The tubes 30 typically have, but are not limited to, an outer diameter in the range of 0.010 inch to 0.050 inch, and an inner diameter in the range of 0.005 inch to 0.030 inch, although other dimensions are also contemplated. The tubes 30 can be arranged at an angle or bias from normal (i.e., relative to a central axis of the mandrel 24) as reflected in FIG. 2A, for example at about a 15 degree angle relative to the central axis of the mandrel 24 (FIG. 1B). Where the bundled mat construction 22 forms two (or more) layers radially arranged one layer over the other, the tubes 30 of immediately adjacent layers (in rolled form) can be angled with respect to one another (e.g., the bias of the tubes 30 in one layer opposes the bias of the tubes 30 in the immediately adjacent layer). FIG. 2C illustrates that a bias of the tubes 30 of an outer layer 32 opposes a bias of the tubes 30 of an immediately underlying layer 34. For example, where the tubes 30 are arranged at a 15 degree angle from the central axis and immediately adjacent layers are arranged such that they have opposing biases, the net resulting bias for the tubes 30 between the two layers 32, 34 is 30 degrees. A purpose for the opposing biases is to prevent any nesting of the tubes 30 between the two layers, which could result in increased resistance to liquid flow (e.g., blood flow), and undesirable and unpredictable shear on the liquid (e.g., blood) flowing there through (i.e., between the tubes 30). Alternatively, the tubes 30 can have other angles or biases relative to the central axis, and can be parallel to the central axis.

Figure 3:
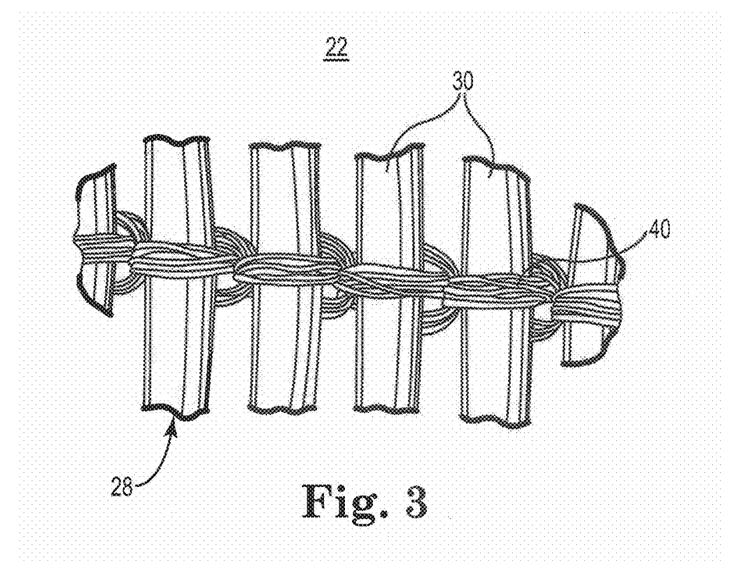
FIG. 3 is a schematic diagram of a tube mat useful with the bundled mat construction of FIG. 2A.

The tubes 30 (within each layer of the bundled mat construction 22) can be held together by one or more threads or other warp carrier structure. For example, FIG. 3 illustrates a plurality of the tubes 30 knitted together in a spaced apart relationship by a warp carrier 40. The warp carrier 40 can include threads assuming various forms such as a multi-filament thread, ribbon, tape, etc. Other warp carriers and weaving techniques are also envisioned by the present disclosure.

One preferred pre-made heat exchanger capillary mat 28 useful with the bundled mat construction 22 is known as HEX PET™, available from Membrana of Charlotte, N.C., and generally comprise a single warp layer of capillary tubes or hollow micro-fibers made of PET. In other embodiments, the pre-made capillary mat 28 consists of two (or more) layers of capillary tubes held together by thread, ribbon, etc. Other heat exchanger mat constructions are equally acceptable. Returning to FIGS. 1A and 1B, regardless of an exact format of the capillary mat 28, the bundled mat construction 22 can be one or more lengths of heat exchanger mats 28 cut to a certain length and then wrapped about the mandrel 24, or can be initially wrapped about a secondary core or mandrel (having a shape and size corresponding with a cylindrical shape of the heat exchanger mandrel 24), and then removed from the secondary mandrel and placed concentrically about the heat exchanger mandrel 24. With either approach, aspects of the present disclosure implicate bundled mat construction 22 manufacturing techniques presenting marked improvements over conventional approaches.

Figure 4A:
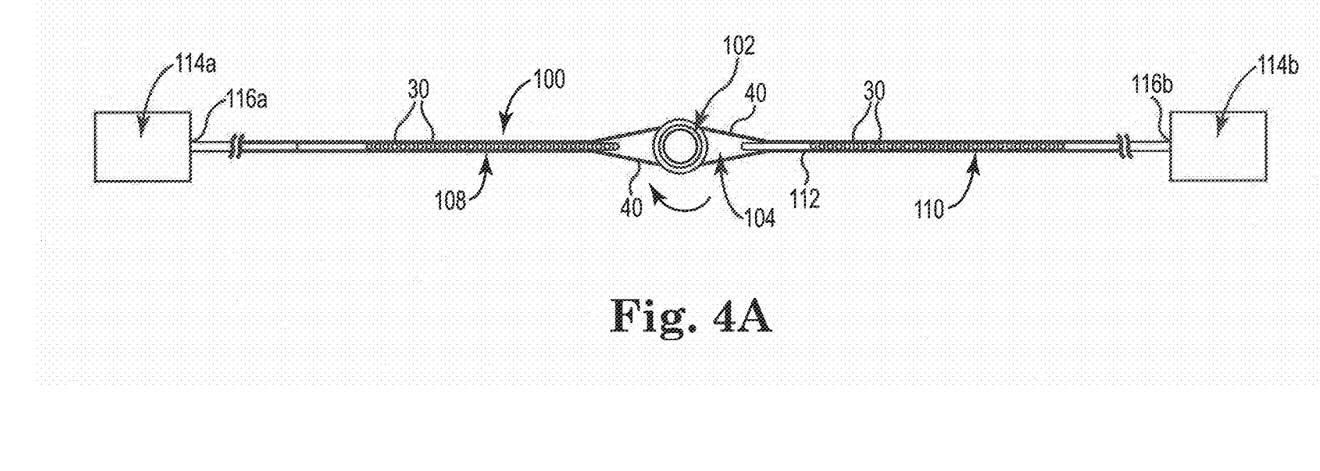
FIGS. 4A-4C schematically illustrate a method of manufacturing the bundled mat construction of FIG. 1A in accordance with principles of the present disclosure.
Figure 4B:
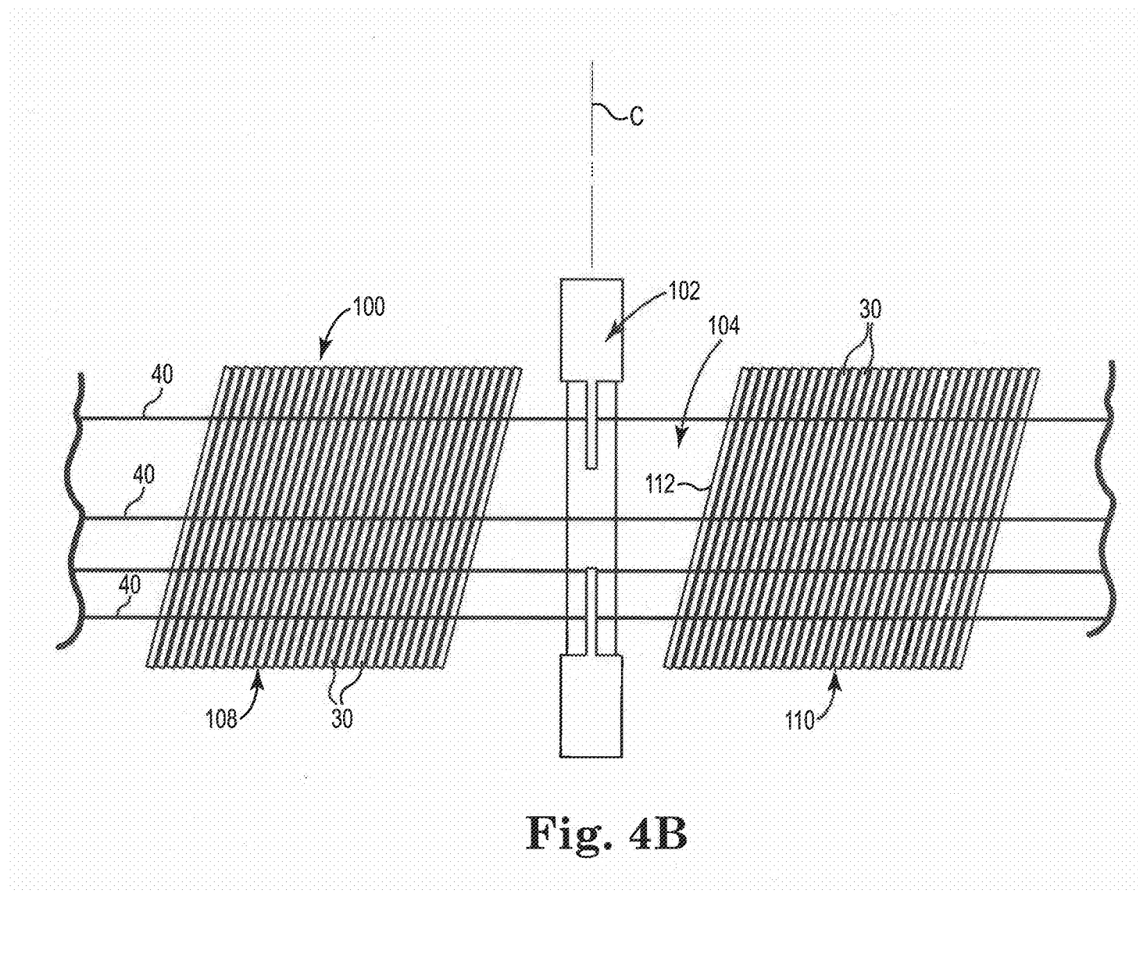
Figure 4C:
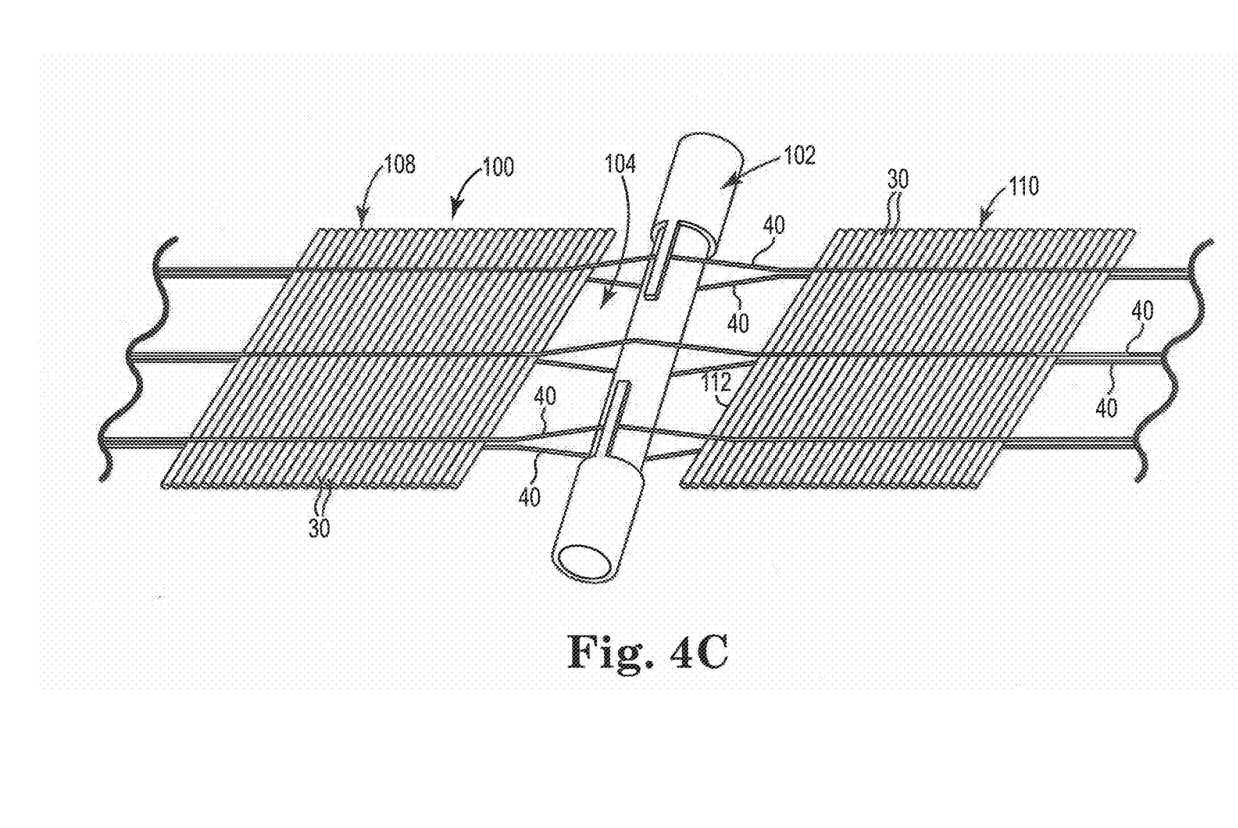

For example, FIGS. 4A-4C schematically illustrates one heat exchanger bundled mat bundling process in accordance with principles of the present disclosure. A heat exchanger capillary mat 100 (as described above with respect to the capillary mat 28) is provided, along with a mandrel 102. The mandrel 102 can be the heat exchanger mandrel 24 (FIG. 1B), or can be the secondary mandrel or core mentioned previously. Regardless, the capillary mat 100 includes the tubes 30 as described above, held together by one (or more) of the warp carriers 40. Prior to bundling, several of the tubes 30 are removed from the pre-made capillary mat 100, while corresponding segments of the warp carriers 40 are left intact to define an open zone 104. The mandrel 102 is inserted within the open zone 104, and is connected to one or more of the warp carriers 40. In this regard, the mandrel 102 can include or form fingers 106 that slidably capture one or more of the warp carriers 40. Once inserted, the mandrel 102 effectively divides the capillary mat 100 into first and second segments 108, 110. The segments 108, 110 are disposed at opposite sides of the mandrel 102. As best reflected in FIG. 4B, the tubes 30 are biased or non-parallel with a central axis C of the mandrel 102. The mandrel 102 is then rolled in the direction indicated by an arrow in FIG. 4A to wrap the segments 108, 110 about the mandrel 102.

Rolling of the mandrel 102 can continue for the number revolutions (or partial revolutions) necessary to achieve a desired size of the resultant bundled mat construction 22 (FIG. 1B). By providing the two mats segments 108, 110 at diametrically opposite locations relative to the mandrel 102, the resultant bundled mat construction is symmetrical (relative to the central axis C of the mandrel 102). This symmetrical arrangement is in direct contrast to conventional bundling techniques, and beneficially provides for even distribution of flow through the bundled mat construction 22.

It will be recognized that following the initial, approximately one-half revolution of the mandrel 102, the first mat segment 108 will begin overlapping the second mat segment 110 (i.e., a leading edge 112 of the second mat segment 110 will be disposed underneath a layer of the first mat segment 108), and the second mat segment 110 will similarly begin overlapping the first mat segment 108. As a result, the bundled mat construction 22 (FIG. 1B) can have two (or more) overlapping tube mat layers, with the layers arranged to provide the tube crossing angle between overlapping layers (e.g., as shown in FIG. 2C). Because this resultant dual or multi layer construction is generated via the two discrete mats segments 108, 110, the mandrel curvature limitations inherently raised by conventional manufacturing processes in which a single mat having a dual layer construction is wrapped about a mandrel are not present. Thus, the mandrel 102 can have a relative small radius (as compare to mandrels employed with conventional rolled mat heat exchangers), resulting in a more compact construction. With extracorporeal circuit heat exchanger applications, this compact construction desirably reduces the circuit's prime volume. Further, and unlike conventional manufacturing processes using a single mat having dual layer construction, the mats segments 108, 110 can have identical lengths before and after rolling, and an identical tension can be applied to the mats segments 108, 110 during rolling, thereby simplifying the manufacturing process.

In some embodiments, tension is maintained in the mat segments 108, 110 while rolling the mandrel 102. For example, FIG. 4A illustrates first and second tension devices 114a, 114b connected to a trailing end 116a, 116b of the mat segments 108, 110, respectively. The tension devices 114a, 114b can assume any form known in the art (e.g., mechanical, pneumatic and electromagnetic brakes, servo control payout systems, etc.), and can be operable to vary an applied tension during the rolling or winding process. The tension affects or controls spacing between the capillary tubes 30 of each wound layer. For example, the applied tension can be incrementally increased (or decreased) as each layer is wound. In other embodiments, a tension applied by the first tension device 114a can differ from that of the second tension device 114a throughout the winding procedure or at various points during winding (e.g., the first tension device 114a can impart an elevated tension to the first mat segment 108 as compared to a tension applied by the second tension device 114b to the second mat segment 110, or vice-versa). Alternatively, the mat segments 108, 110 can be connected to a single tension device.

Figure 5:
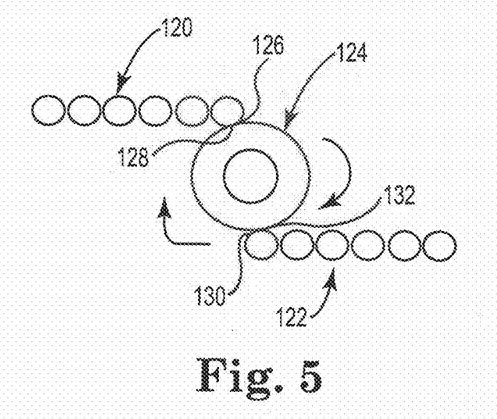
FIG. 5 a schematic diagram of another method of manufacturing the bundled mat construction of FIG. 1A in accordance with principles of the present disclosure.

Another heat exchanger mat bundling process in accordance with principles of the present disclosure is schematically shown in FIG. 5. First and second heat exchanger capillary tube mats 120, 122 (as described above) are provided, along with an appropriately sized and shaped mandrel 124. The mandrel 124 can be the heat exchanger mandrel 24 (FIG. 1B), or can be the secondary mandrel or core mentioned previously. A leading edge 126 of the first capillary mat 120 is attached to a first side 128 of the mandrel 124. Similarly, a leading edge 130 of the second capillary mat 122 is attached to a second side 132 of the mandrel 124, with the so-selected sides 128, 132 being opposite one another. As a point of clarification, because the mandrel 124 is cylindrical, the sides 128, 132 may not be discernable features of the mandrel 124; as such, reference to "first and second sides of the mandrel" in the context of the present disclosure means that the leading edges 126, 130 are attached to the mandrel 124 at diametrically opposite positions. Where the capillary mats 120, 122 are single layer capillary tube mats formed to provide the angled or biased orientation of the corresponding tubes, the mats 120, 122 are arranged relative to the mandrel 124 such that the tube angle orientation of the first mat 120 is in opposition to the tube angle orientation of the second mat 122. Further, the tube 30 of both mats 120, 122 are biased relative to the central axis of the mandrel 124.

Once the first and second mats 120, 122 are attached to the mandrel 124, the mandrel 124 is rolled in the direction indicated by arrows in FIG. 5. As a result, the first and second mats 120, 122 wrap about the mandrel 124 commensurate with the above description. Tension can be applied to the mats 120, 122 during winding as described above. The resultant bundled mat construction 22 (FIG. 1B) is symmetrical relative to a central axis of the mandrel 124, and may have a multi-layer construction. The benefits associated with the techniques of FIGS. 4A-4C apply equally to the methodologies of FIG. 5.

Figure 6:
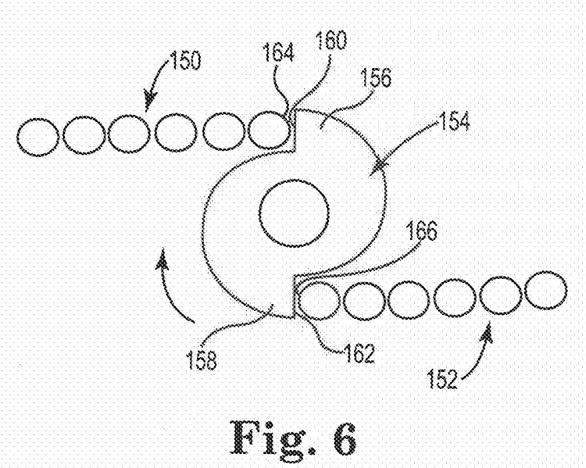
FIG. 6 a schematic diagram of another method of manufacturing the bundled mat construction of FIG. 1A in accordance with principles of the present disclosure.
Figure 7A:
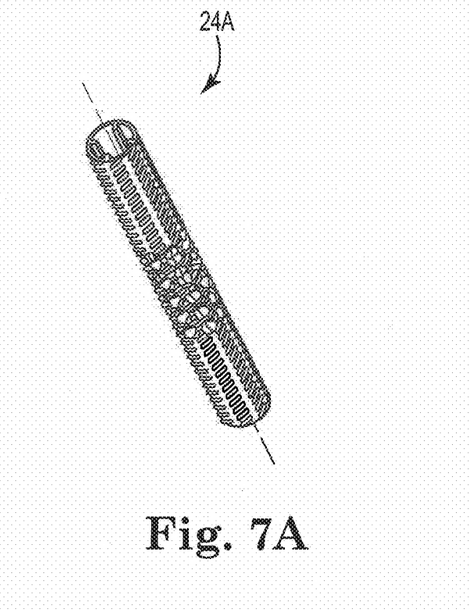
FIGS. 7A-7D are perspective views of mandrels useful with the heat exchanger of FIG. 1A.
Figure 7B:
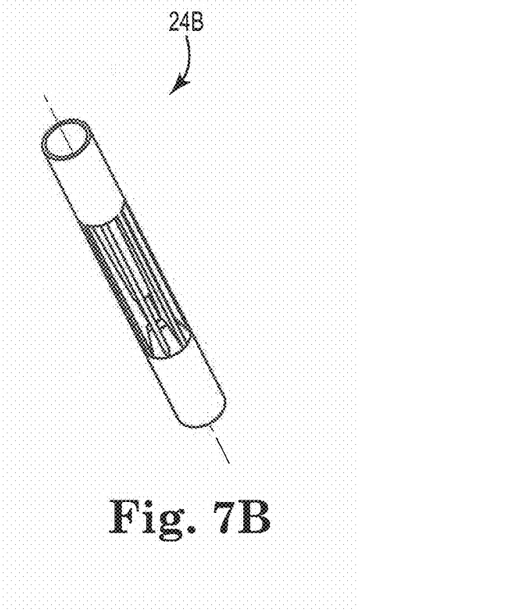
Figure 7C:
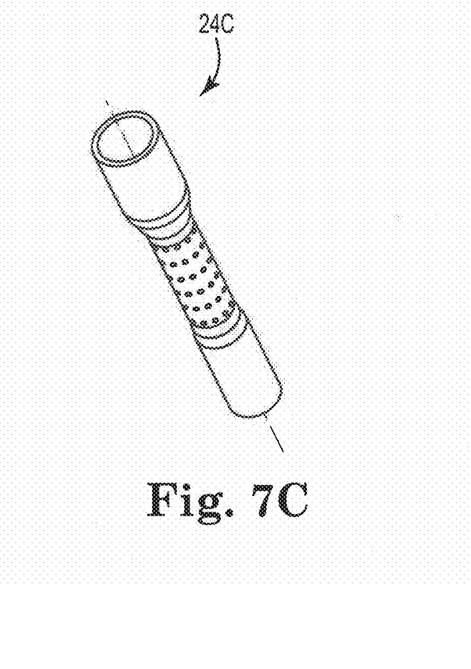
Figure 7D:
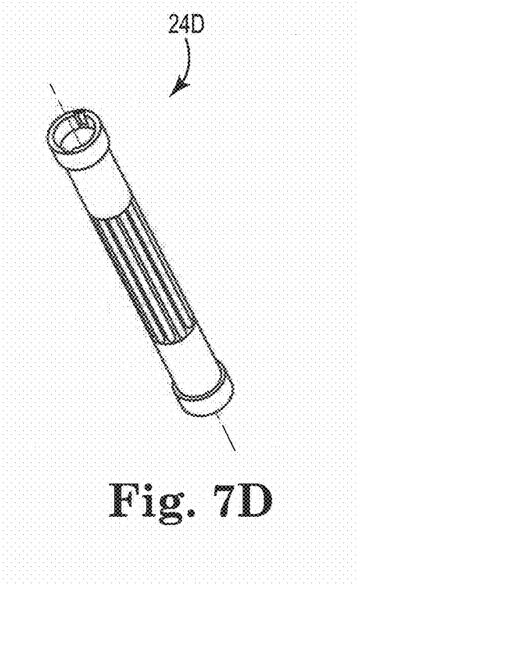

Another heat exchanger mat bundling process in accordance with principles of the present disclosure is schematically shown in FIG. 6. First and second heat exchanger capillary mats 150, 152 (as described above) are provided, along with a mandrel 154. The mandrel 154 can be the heat exchanger mandrel 24 (FIG. 1B), or can be the secondary mandrel or core mentioned previously. With the embodiment of FIG. 6, however, the mandrel 154 includes opposing radial steps or offsets 156, 158, each defining a radial shoulder 160, 162, respectively, relative to a central axis of the mandrel 154. The shoulders 160, 162 are diametrically opposed to one another, and a radial extension of the shoulders 160, 162 approximates (e.g., equals) a thickness of the mats 150, 152.

Manufacturing of a bundled mat construction includes attaching a leading edge 164 of the first mat 150 to the first shoulder 160, and a leading edge 166 of the second mat 152 to the second shoulder 162. The mandrel 154 is then rolled in the direction indicated by an arrow in FIG. 6 to wrap the mats 150, 152 about the mandrel 154 in manners commensurate with the above descriptions with respect to FIGS. 4A-4C. Tension can be applied to the mats 150, 152 during winding as described above. The resultant bundled mat construction 22 (FIG. 1B) is symmetrical relative to a central axis of the mandrel 154, and may have a multi-layer construction. Further, the radial offsets 156, 158 provide a smooth transition of the mats 150, 152 from a surface of the mandrel 154 following the initial one-half revolution. For example, near the end of the first one-half revolution of the mandrel 154, the region of the first mat 150 being wound over the mandrel 154 will transition from the surface of the mandrel 154 and on to the previously-applied region of the second mat 152, with the first mat 150 smoothly transitioning off of the second shoulder 162 and onto the previously-applied region of the second mat 152. The benefits described above with respect to the techniques of FIGS. 4A-4C apply equally to the methodologies of FIG. 6.

Regardless of the selected manufacturing technique, and returning to FIG. 1B, the resultant bundled mat construction 22 is applied to the mandrel 24. Once again, the bundled mat construction 22 can be directly wrapped over the mandrel 24, in accordance with the above descriptions, or can be wound about a secondary mandrel and subsequently placed over the heat exchanger mandrel 24. The heat exchanger mandrel 24 can assume a variety of forms, and generally defines an inlet 200, a passageway 202, and one or more outlet openings 204. The inlet 200 is fluidly open to the passageway 202, as are the outlet openings 204. With embodiments in which the heat exchanger 20 is intended to impart a radially outward flow pattern onto liquid flowing through the passageway 202 (and otherwise entering the passageway 202 via the inlet 200), the openings 204 can be formed along an intermediate portion of the mandrel 24, projecting through a wall thickness thereof. Other locations for the outlet opening(s) 204 are equally acceptable. Several other non-limiting examples of mandrels 24A-24D useful with the present disclosure are provided in FIGS. 7A-7D.

Returning to FIG. 1B, the optional bands 26a, 26b can be assembled to opposing ends of the bundled mat construction 22. The bands 26a, 26b hold the bundled mat construction 22 about the mandrel 24 in a manner permitting flow of a heat exchange fluid through the tubes (not separately shown in FIG. 1B) of the bundled mat construction 22. For example, FIG. 1B references a fluid entry side 220 collectively defined by the capillary tubes, and a corresponding fluid exit side 222. Optionally, the entry and exit sides 220, 222 can be embedded in a solidified potting compound as known to those of ordinary skill in the art. As shown, the bands 26a, 26b are constructed so as to not impede delivery of fluid to the entry side 220 or draining of fluid from the exit side 222. The bands 26a, 26b can assume a number of forms differing from those reflected by FIGS. 1A-1C, and in other embodiments can be omitted.

The heat exchanger 20 of FIGS. 1A-1C can be assembled within a separate outer housing (akin to the housing described below) that establishes or forms fluid pathways for blood and heat exchange fluid within an extracorporeal blood circuit. Cardiopulmonary support heat exchanger housings are known for those of skill, for example the housings provided with an ECMOtherm II® heat exchanger apparatus or BIOtherm™ heat exchanger apparatus, both available from Medtronic, Inc., of Minneapolis, Minn. As a point of reference, the term "heat exchanger" includes the bundled mat construction 22 and the heat exchanger mandrel (or core) 34. The so-defined heat exchanger 20 can be utilized as part of a standalone, finished heat exchanger apparatus or device that otherwise includes an outer housing and various fluid ports. Alternatively, the so-defined heat exchanger 20 can serve as the subassembly of a combination extracorporeal blood circuit apparatus that performs heat exchange and one or more additional functions.

Figure 8:
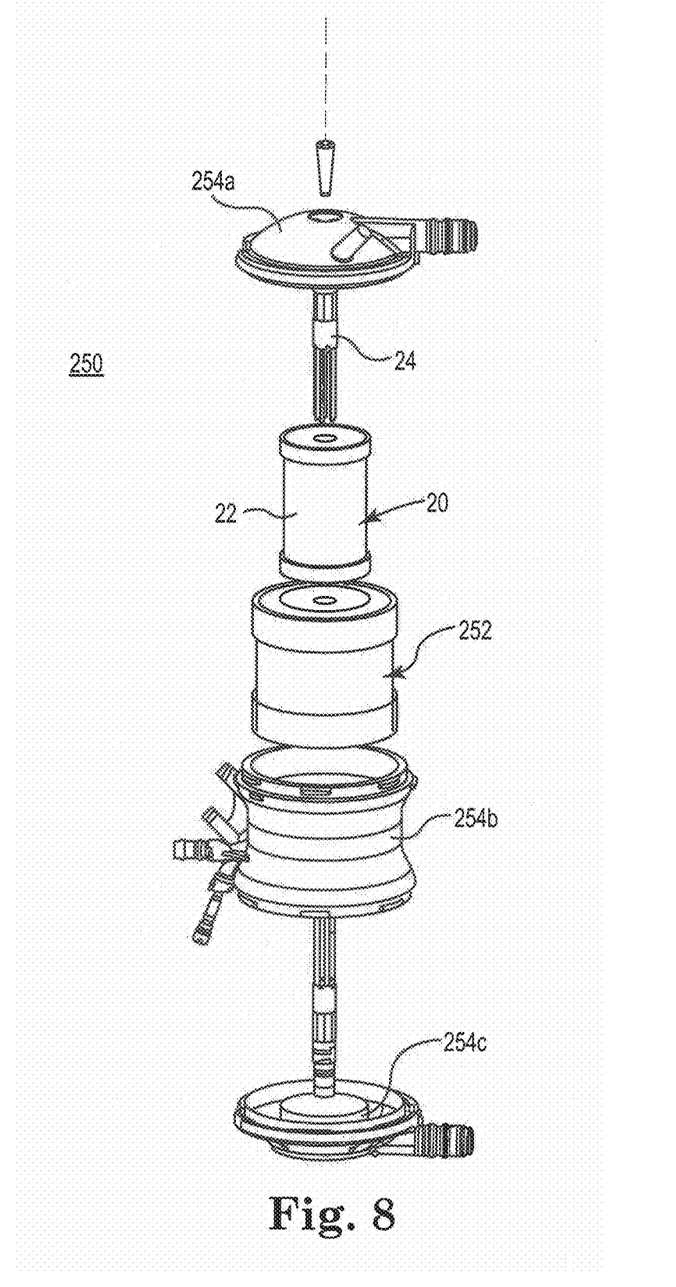
FIG. 8 is an exploded, perspective view of an extracorporeal circuit apparatus in accordance with the present disclosure and including the heat exchanger of FIG. 1A.

As an alternative to the standalone heat exchanger apparatus, rolled mat heat exchangers of the present disclosure (and in particular the bundled mat construction 22) can be incorporated into or as part of other fluid handling devices performing differing or additional functions. For example, FIG. 8 illustrates a combination oxygenator and heat exchanger apparatus 250 incorporating the rolled mat heat exchanger 20. The apparatus 250 further includes an oxygenator 252 and various housing components (referenced generally at 254a-254c). The oxygenator 252 can assume any form known in the art, as can the housing components 254a-254c. For ease of illustration, FIG. 8 illustrates the mandrel 24 apart from the bundled mat construction 22. In other embodiments, the apparatus 250 can include a separate supportive core over which the heat exchanger mandrel 24 is disposed.

Figure 9:
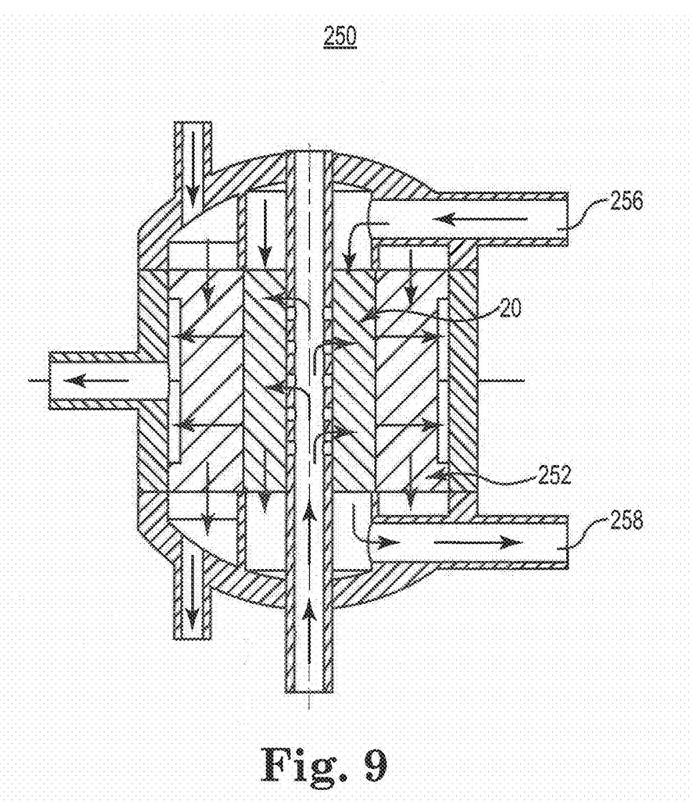
FIG. 9 is a simplified, cross-sectional view of the apparatus of FIG. 8.

FIG. 9 shows, in simplified form, fluid flow through the apparatus 250. When used for extracorporeal circuit blood handling, the heat exchanger 20 may either heat or cool the blood flowing through the apparatus 250. Since hypothermia may be used during cardiac surgery (especially in infant and pediatric surgeries) to reduce oxygen demand, and since rapid re-warming of the blood undesirably produces bubble emboli, the heat exchanger 20 is generally used to gradually re-warm blood and prevent emboli formation. The heat transfer medium used in the heat exchanger 20 may comprise water or other suitable fluids. FIG. 9 includes arrows (labeled as "FLUID") that show the flow of a heat transfer medium through the heat exchanger 20, with entry at a fluid inlet port 256 and exit at a fluid outlet port 258. After flowing through the heat exchanger 20, blood moves sequentially and radially outward and through the oxygenator 252 that is arranged around the heat exchanger 20. The direction of blood flow is indicated by arrows (labeled as "BLOOD"). FIG. 9 also includes arrows that show the flow of an oxygen-containing gas medium through the oxygenator 252 (labeled as "GAS"). The oxygenator 252 may concentrically surround the heat exchanger 20. Also, the oxygenator 252 may be wound on the heat exchanger 20 (e.g., as one or more continuous microporous hollow fibers). It will be understood that the heat exchanger 20 of the present disclosure can be incorporated into a plethora of other apparatuses that may or may not include the oxygenator 252.

The rolled capillary tube mat heat exchangers, and methods of manufacture thereof, of the present disclosure provide marked improvements over existing devices and methods. By attaching two single layer capillary tube mats (or mat segments) at diametrically opposite sides of a cylindrical mandrel and then rolling the mandrel, the methods of the present disclosure beneficially create symmetrical bundled mat constructions. Further, methods of the present disclosure can produce multi-layer bundled mat constructions in a simplified, consistent manner.

Although the present disclosure has been described with reference to preferred embodiments, workers skilled in the art will recognize that changes can be made in form and detail without departing from the spirit and scope of the present disclosure.

What is claimed is:

1. A method of making a bundled mat construction for use in an extracorporeal blood circuit heat exchanger, the method comprising:
providing a single capillary tube mat;
removing at least one tube from the single mat to define an open zone in the single mat;
inserting a mandrel into the open zone, wherein upon assembly of the mandrel to the single mat, the mandrel divides the single mat into a first capillary mat segment having a leading edge attached to a first side of the mandrel and a second capillary mat segment having a leading edge attached to a second side of the mandrel, the second side being diametrically opposite the first side; and rolling the mandrel relative to the mat segments.

2. The method of claim 1, wherein the first capillary tube mat segment is a first single layer capillary tube mat, and the second capillary tube mat segment is a second single layer capillary mat.

3. The method of claim 1, wherein an orientation of capillary tubes of the first capillary tube mat segment is in opposition to an orientation of capillary tubes of the second capillary tube mat segment, and further wherein following the step of rolling the mandrel, a region of the first capillary tube mat segment overlaps a region of the second capillary tube mat segment to define a crossing angle between the tubes of the first mat region and the tubes of the second mat region.

4. The method of claim 1, wherein the single mat includes a warp carrier interconnecting tubes of the mat, and further wherein inserting the mandrel into the open zone includes securing the mandrel to the warp carrier.

5. The method of claim 4, wherein the mandrel includes a finger for slidably capturing the warp carrier.

6. The method of claim 1, further comprising:
applying tension to each of the capillary tube mat segments during the step of rolling the mandrel.

7. The method of claim 6, wherein a first tension device applies tension to the first capillary tube mat segment, and a second tension device applies tension to the second capillary tube mat segment.

8. The method of claim 7, wherein the first tension device is operated independent of the second tension device.

9. The method of claim 6, wherein an applied tension is varied during the step of rolling the mandrel.

10. The method of claim 1, wherein capillary tubes of the capillary tube mat segments have an outer diameter of not greater than 0.05 inch.

11. The method of claim 1, wherein following the step of rolling, capillary tubes of the wound mat segments define radial layers relative to the central axis of the mandrel, the radial layers being symmetrical.

12. An extracorporeal blood circuit rolled mat heat exchanger apparatus comprising:
a core; and
a bundled mat construction produced by the method of claim 1 and disposed about the core.

13. The apparatus of claim 12, wherein a region of the first mat segment overlaps a region of the second mat segment, and further wherein tubes of the first mat region and tubes of the second mat region define a crossing angle relative to one another.

14. The apparatus of claim 12, wherein capillary tubes of the bundled mat construction define a fluid entry side and a fluid exit side, the apparatus further comprising:
a housing surrounding the bundled mat construction and establishing a first fluid pathway from an inlet port to the fluid entry side and a second fluid pathway from the fluid exit side to an outlet port.

* * * * *